(12) United States Patent
Goldman et al.

(10) Patent No.: US 7,381,980 B2
(45) Date of Patent: Jun. 3, 2008

(54) METHOD AND APPARATUS FOR IMPROVING A COMPUTED RADIOGRAPHY IMAGE

(75) Inventors: Ross Bryan Goldman, Scarborough, ME (US); Fredric Louis Farber, Falmouth, ME (US); Bret John King, Windham, ME (US); Joseph William Horr, Casco, ME (US); Michele Mary Torrusio, Portland, ME (US)

(73) Assignee: IDEXX Laboratories, Inc., Westbrook, ME (US)

( * ) Notice: Subject to any disclaimer, the term of this patent is extended or adjusted under 35 U.S.C. 154(b) by 782 days.

(21) Appl. No.: 10/339,152

(22) Filed: Jan. 9, 2003

(65) Prior Publication Data
US 2004/0135108 A1 Jul. 15, 2004

(51) Int. Cl.
*G03B 42/08* (2006.01)
(52) U.S. Cl. .................................................. 250/584
(58) Field of Classification Search ................. 250/584
See application file for complete search history.

(56) References Cited
U.S. PATENT DOCUMENTS

| | | | | |
|---|---|---|---|---|
| 4,602,154 | A | * | 7/1986 | Taniguchi .............. 250/227.11 |
| 4,692,813 | A | * | 9/1987 | Conrad et al. .............. 358/406 |
| 4,816,923 | A | | 3/1989 | Saotome |
| 5,047,643 | A | | 9/1991 | Ogura |
| 5,157,083 | A | * | 10/1992 | Aonuma et al. ............ 525/285 |
| 5,859,441 | A | | 1/1999 | Muraishi |
| 6,207,968 | B1 | | 3/2001 | Koren |
| 6,291,831 | B1 | | 9/2001 | Koren |
| 6,504,165 | B1 | * | 1/2003 | Furutoh .................... 250/515.1 |
| 6,624,438 | B2 | * | 9/2003 | Koren ......................... 250/584 |
| 2001/0019115 | A1 | * | 9/2001 | Tajima ....................... 250/588 |
| 2002/0003219 | A1 | | 1/2002 | Koren |

FOREIGN PATENT DOCUMENTS

| | | |
|---|---|---|
| EP | 0 683 415 | 11/1995 |
| EP | 0 741 311 | 11/1996 |

OTHER PUBLICATIONS

International Search Report dated Jun. 23, 2004 from PCT/US2004/000426.

* cited by examiner

*Primary Examiner*—David P. Porta
*Assistant Examiner*—Shun Lee
(74) *Attorney, Agent, or Firm*—Carter, DeLuca, Farrell & Schmidt, LLP

(57) ABSTRACT

An optical system for an internal drum readout apparatus is disclosed. The optical system includes a hollow cylindrical segment defining a central axis, a support structure configured and adapted to translate along the central axis, a mirror mounted on the support structure for translational movement therewith and for rotational spinning around the central axis, a light source mounted to the support structure for providing a beam capable of being directed along the central axis which in turn is directed against the medium thereby producing a stimulated light, a detector coaxially aligned with the central axis, the detector being configured and adapted to absorb stimulated light direct toward and reflected off of the angled mirror, and a shroud mounted on the support structure for blocking stimulated light not directed toward the angled mirror, wherein the stimulated light not directed toward the angled mirror would otherwise degrade the medium prematurely.

39 Claims, 11 Drawing Sheets

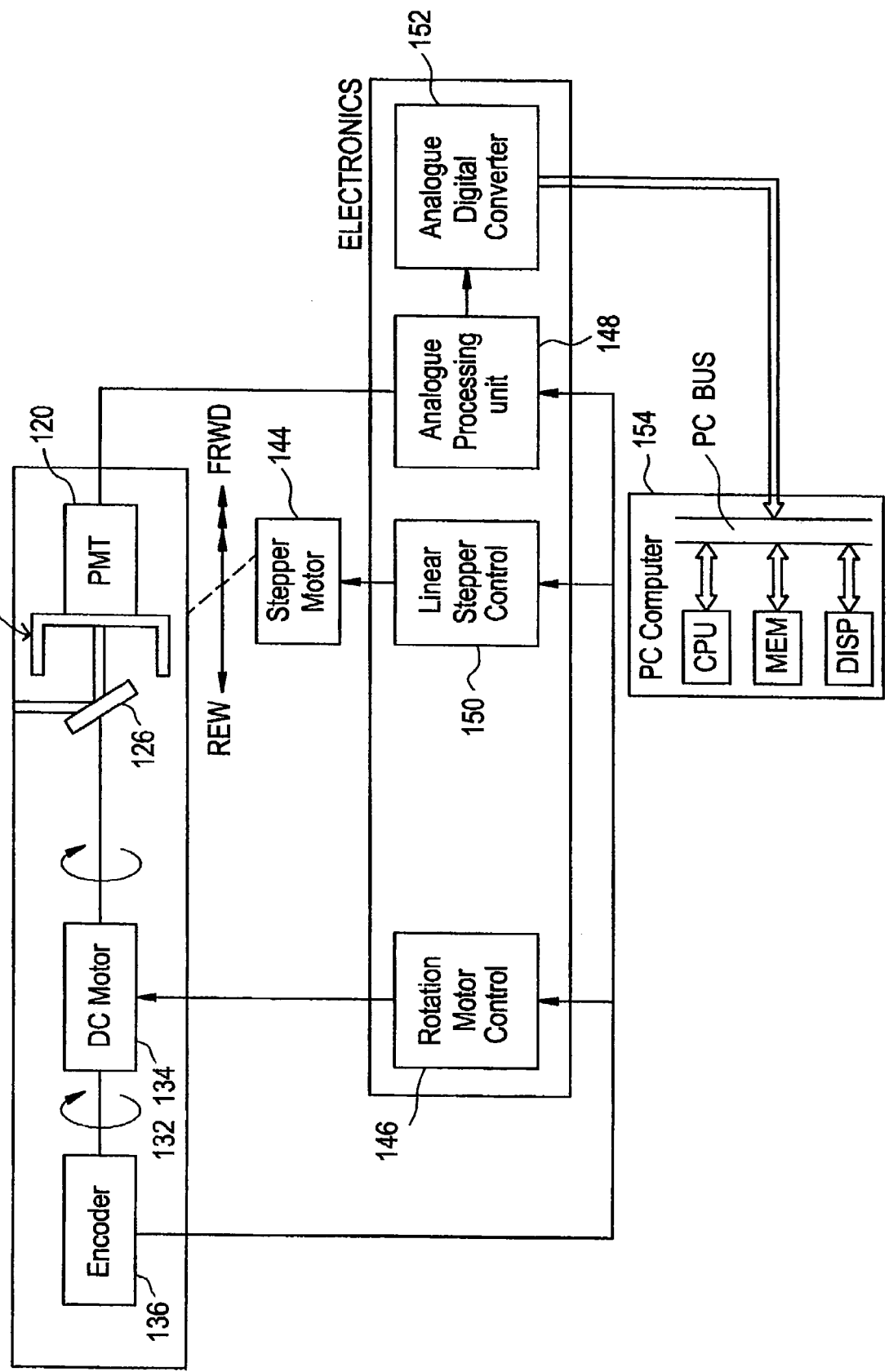

METHOD AND APPARATUS FOR IMPROVING A COMPUTED RADIOGRAPHY IMAGE

BACKGROUND

1. Technical Field

The present disclosure is directed to an axially oriented optical system and method of using the same, and more particularly, the present disclosure is directed to an apparatus for improving the computed radiography image generated by the axially oriented optical system and the method for using the same. The present disclosure is also directed to a method of using the optical system disclosed herein.

2. Background of Related Art

Previously, scanners of X-ray exposed phosphor plates performed their function on a flat-bed or the external surface of a rotating drum. These systems have problems that increase the cost and reduce the quality of the X-ray image. The undesirable results obtained with a flat-bed or rotating drum system are caused by the continuous changing of the angles and distances of the light beam paths used for stimulating the phosphor of the X-ray exposed phosphor plate. Also, the collection of the stimulated light is performed with a different path and angle for each position on the phosphor plate, thereby requiring complicated and expensive compensation measures. Additionally, the complications with attendant increases in cost are exacerbated when existing systems for supporting the phosphor plates do not maintain a fixed positioning during the scanning procedure.

Accordingly, many, if not all, of these deficiencies have been overcome in U.S. Pat. No. 6,291,831 to Koren, the entire disclosure of which is herein incorporated by reference. As seen in FIG. 1, the Koren Patent discloses a scanning apparatus 10 including a fixed, hollow cylindrical segment 12 having a central, longitudinal axis 16, the interior of which forms a concave surface for intimate contact with a medium for recording and/or readout 14 (e.g., a phosphor plate), a support structure forming a transport (not shown) for translational movement along the axis, a light source 18 (e.g. laser) mounted on the transport for movement therewith and for providing a beam capable of being directed along the axis, and a slanted mirror 26, angled 45° with respect to the axis and mounted on the transport for translational movement therewith and for rotational spinning around the axis.

According to the Koren Patent, the scanning operation involves the mounting of laser 18 and slanted mirror 26 in such a manner so that slanted mirror 26 bends a beam of light 90° and is capable of rotating the beam of light. Accordingly, the beam of light can then be manipulated to form a rotating spot on phosphor plate 14 which follows a path of a portion of a circle on phosphor plate 14. The transport 38, including optical system 10a having light source 18 and spinning mirror 26, and its subsequent movement to traverse phosphor plate 14 is coordinated with the rotative movement of the spot such that when the spot reaches the end of phosphor plate 14, transport 38 is moved the distance of one pixel in order for the next scan to be conducted. According to the Koren Patent, readout of a previously X-ray exposed phosphor plate is obtained a 635 nm laser 18 stimulating the crystal layer of phosphor plate 14 causing it to radiate light at 390 nm as the beam spot on the phosphor plate 14 makes its scan. The rotating mirror 26 receives the emitted light around its outer periphery for reflection onto a Schott type filter 24 which is transparent to 390 nm light and absorbent to 635 nm light. The light passing through filter 24 is applied to detector photomultiplier tube 20, which converts the light to an electrical signal that is amplified and gated to represent one pixel on the circular scan and converted to a digital number representing the brightness of the pixel.

In view of the aforementioned improvements and benefits of the Koren Patent over the prior art device, a need exists for an improved scanning apparatus which further reduces distortion, cost and the overall complexity of the operation while simultaneously improving the accuracy and quality of the resulting scan.

SUMMARY

The present disclosure provides a shroud for use in an optical scanning apparatus including a hollow cylindrical segment defining a central axis, the cylindrical segment forming a support surface for a medium to be scanned while the medium conforms to an inner surface of the cylindrical segment; a support structure for translational movement along the central axis; a light source mounted on the transport for movement therewith and for providing a beam capable of being directed along the central axis; a reflecting element for directing the beam toward the medium to produce a stimulated light; and a slanted mirror mounted to the transport for translational movement therewith and for rotational spinning around the central axis, the slanted mirror reflecting stimulated light toward a light detector. The shroud includes a base wall configured and adapted to be coupled to the transport, the base wall defining an outer terminal edge; and an annular side wall integrally formed along the outer terminal edge, the annular side wall extending in a direction toward the slanted mirror, wherein the base wall and the annular side wall block the stimulated light from traveling past the detector and stimulating the medium prior to the beam stimulating the medium. It is envisioned that the base wall is configured and dimensioned such that the outer terminal edge thereof is in close proximity with the inner surface of the cylinder segment. It is further envisioned that the shroud could include a wiper or lip extending along the outer surface of the annular wall.

The present disclosure further relates to an optical system for an internal drum readout apparatus, including a hollow cylindrical segment defining a central axis, the cylindrical segment forming a support surface for a medium to be scanned while the medium conforms to an inner surface thereof, a support structure configured and adapted to translate along the central axis, a mirror mounted on the support structure for translational movement therewith and for rotational spinning around the central axis, the mirror angled with respect to the central axis, a light source mounted to the support structure for providing a beam capable of being directed along the central axis which in turn is directed against the medium thereby producing a stimulated light, a detector coaxially aligned with the central axis, the detector being configured and adapted to absorb stimulated light direct toward and reflected off of the angled mirror, and a shroud mounted on the support structure for blocking stimulated light which is not directed toward the angled mirror, wherein the stimulated light not directed toward the angled mirror would otherwise degrade the medium prematurely. It is envisioned that the shroud is configured and dimensioned to block stimulated light which is not directed toward the detector. It is further envisioned that the shroud is configured and dimensioned to block errant light from entering the detector.

In one aspect of the present disclosure, the shroud includes a base wall defining an outer terminal edge and an annular wall integrally formed around the outer terminal edge of the base wall. The annular wall of the shroud preferably extends toward the angled mirror. It is contemplated that the annular wall is orthogonally oriented with respect to the base wall. It is envisioned the annular wall extends toward the angled mirror a distance sufficient to block errant light while still permitting transmission of the beam and the stimulated light. It is further envisioned that the optical system could include a wiper or lip extending along the outer surface of the annular wall, wherein the wiper reduces a gap between the outer surface of the annular wall and an inner surface of hollow cylindrical segment. It is envisioned that the wiper is constructed from a resilient polymeric material and/or a brush-like material.

In another aspect of the present disclosure, the shroud includes a base wall extending radially outward and having an outer terminal edge in close proximity with an inner surface of the hollow cylindrical segment, wherein the base wall is constructed from a polymeric material. It is envisioned that the optical system could further include a wiper or lip extending radially outward from the outer terminal edge thereof, wherein the wiper is constructed from resilient polymeric material and/or a brush-like material.

According to an embodiment of the present, the mirror is angled at about 45° relative to the central axis. In one embodiment, the mirror is angled to reflect the stimulated light toward the detector. In another embodiment, the mirror is angled to reflect the beam toward the medium.

It is envisioned that the light source is proximal of the angled mirror and the detector includes a reflecting surface mounted thereto for directing the beam toward the angled mirror. The light source is distal of the angled mirror and the angled mirror includes a central opening through which the beam passes and a reflecting surface mounted to the angled mirror for directing the beam toward the medium.

It is contemplated that the light source is a laser. It is further contemplated that the medium is a phosphor plate. The phosphor plate emits a stimulated light when excited by the beam which stimulated light corresponds to data recorded thereon.

It is envisioned that the detector includes a filter which permits light having a specific wavelength therethrough.

The present disclosure is also directed to a method of improving a computer radiography image in a scanning apparatus wherein the scanning apparatus includes a fixed hollow cylindrical segment having a central, longitudinal axis, the interior of which forms a concave surface for intimate contact with a medium for recording and/or readout; a support structure forming a transport for translational movement along the axis; a light source mounted on the transport for movement therewith and for providing a beam capable of being directed along the axis; a slanted mirror, angled 45° with respect to the axis and mounted on the transport for translational movement therewith and for rotational spinning around the axis, the mirror configured to reflect the stimulated light onto a collector tube.

The method includes the steps of providing a shroud device for reducing the collection of stimulated light and errant light which is not directed toward the angled mirror and which would otherwise prematurely degrade the medium, and mounting the shroud device to the collector tube such that the annular wall extends towards the angled mirror.

It is envisioned that according to the method disclosed herein, the shroud device includes a base wall extending radially outward and having an outer terminal edge in close proximity with an inner surface of the hollow cylindrical segment and an annular wall integrally formed around the outer terminal edge of the base wall.

The method may further include the step of providing a wiper or lip on the outer surface of the annular wall to reduce a gap between the outer surface of the annular wall and an inner surface of the cylindrical segment.

Other objects and features of the present disclosure will become apparent from consideration of the following description taken in conjunction with the accompanying drawings.

BRIEF DESCRIPTION OF THE DRAWINGS

By way of example only, preferred embodiments of the disclosure will be described with reference to the accompanying drawings, in which:

FIG. 10 is a block diagram of a control system for operation of the optical system of the present disclosure.

DETAILED DESCRIPTION OF PREFERRED EMBODIMENTS

Figure 1A:
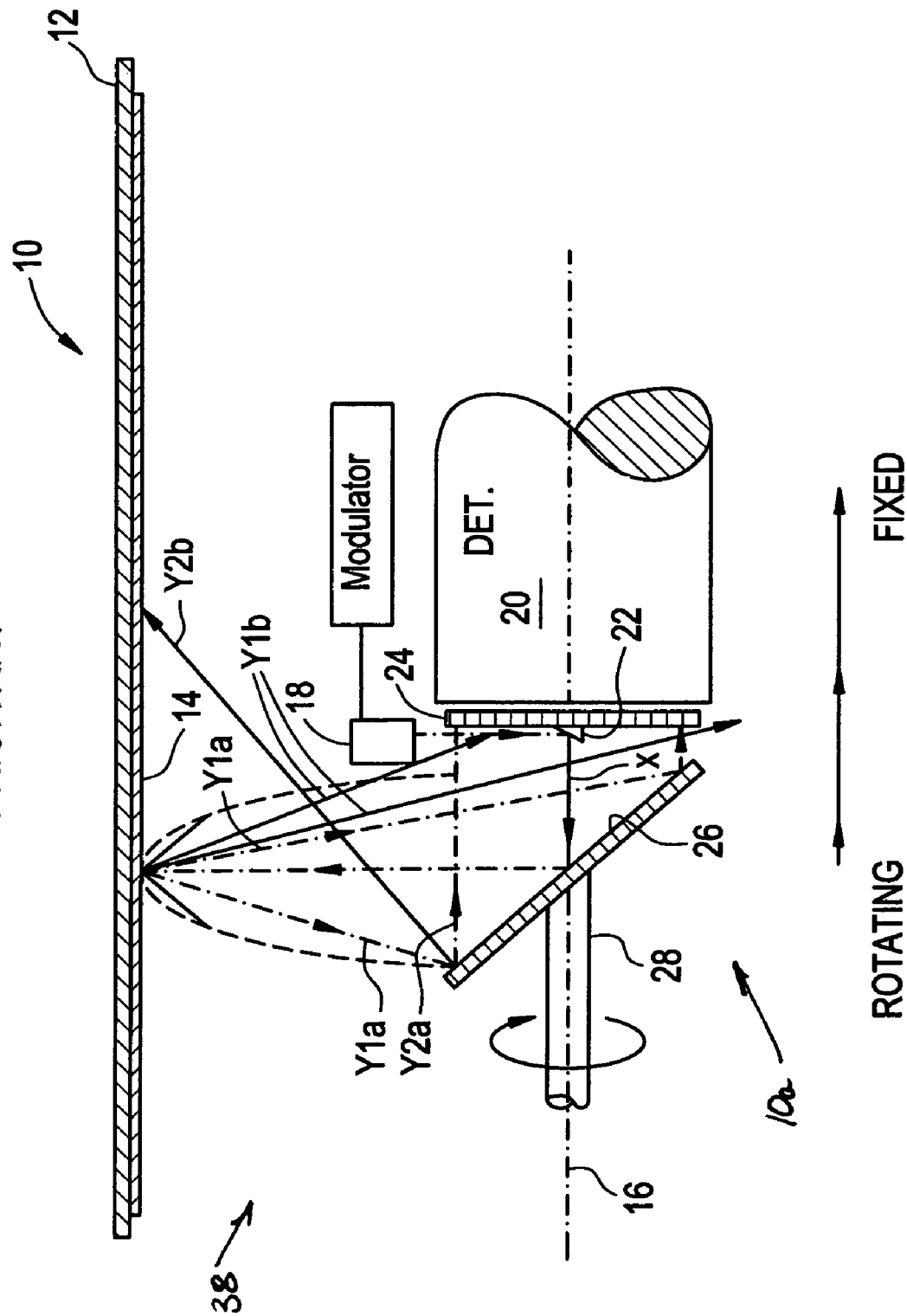
FIG. 1A is a schematic representation of one embodiment of a prior art arrangement of an optical system as described above.
Figure 1B:
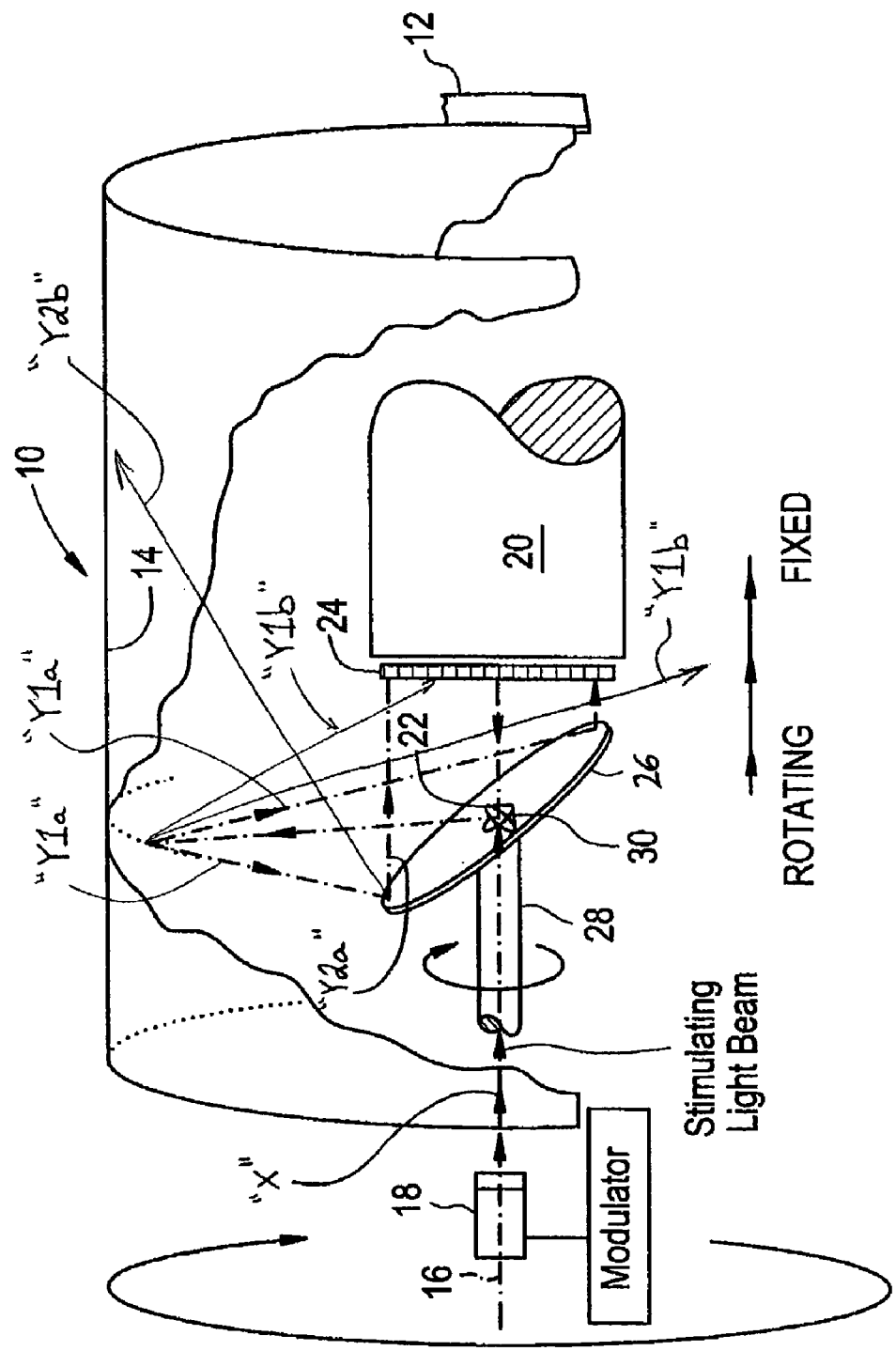
FIG. 1B is a schematic representation of an alternative embodiment of a prior art arrangement of an optical system.

As described above, a prior art arrangement of an optical system is shown and described in FIG. 1A. As seen in FIG. 1B, an alternative embodiment of a prior art arrangement of an optical system is shown whereby the light source 18 lies on axis 16 of shaft 28 which is collinear with hollow cylinder portion 12, which forms the support for phosphor plate 14. Shaft 28 is hollow in order to permit the beam to pass therethrough and angled mirror 26 has been provided with a hole 30 at its center in order for the beam to pass onto a small mirror 22, which is mounted within hole 30. Accordingly, when the beam passes through shaft 28, small mirror 22 redirects the beam towards phosphor plate 14.

Figure 1C:
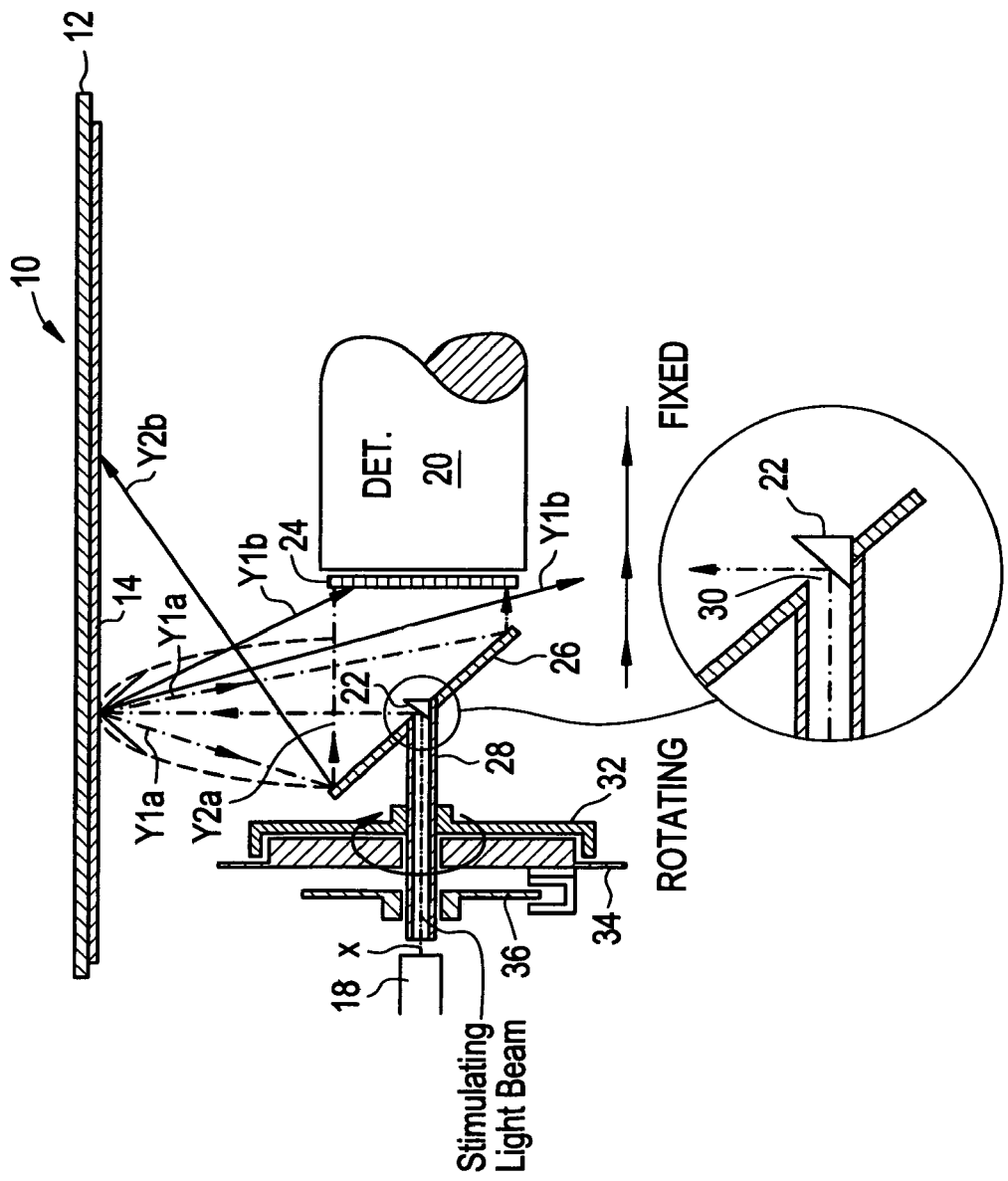
FIG. 1C is a schematic representation of a prior art arrangement of FIG. 1A or 1B including a rotative drive and encoding system.

In FIG. 1C, there is shown the prior art embodiment of FIG. 1B with the addition of a conventional motor mechanism including a rotor 32, mounted for rotation with shaft 28, and a fixed stator 34. In the prior art embodiments of FIGS. 1A-1C, filter 24 and detector 20 do not rotate. A conventional on-axis optical encoder system 36 is also mounted with respect to the motor mechanism for providing feedback pulses to stabilize rotation speed and for determining the beam positioning.

In each of the prior art optical system embodiments shown in FIGS. 1A-1C, the Computer Radiography (CR) image is degraded in at least one of two ways. The CR image can be degraded by the beam reflecting within hollow cylinder 12 and prematurely releasing X-ray energy stored in phosphor plate 14. Additionally, reflected beams within the CR chamber can cause degradation of the CR image when errant rays enter photomultiplier tube 20.

Figure 2:
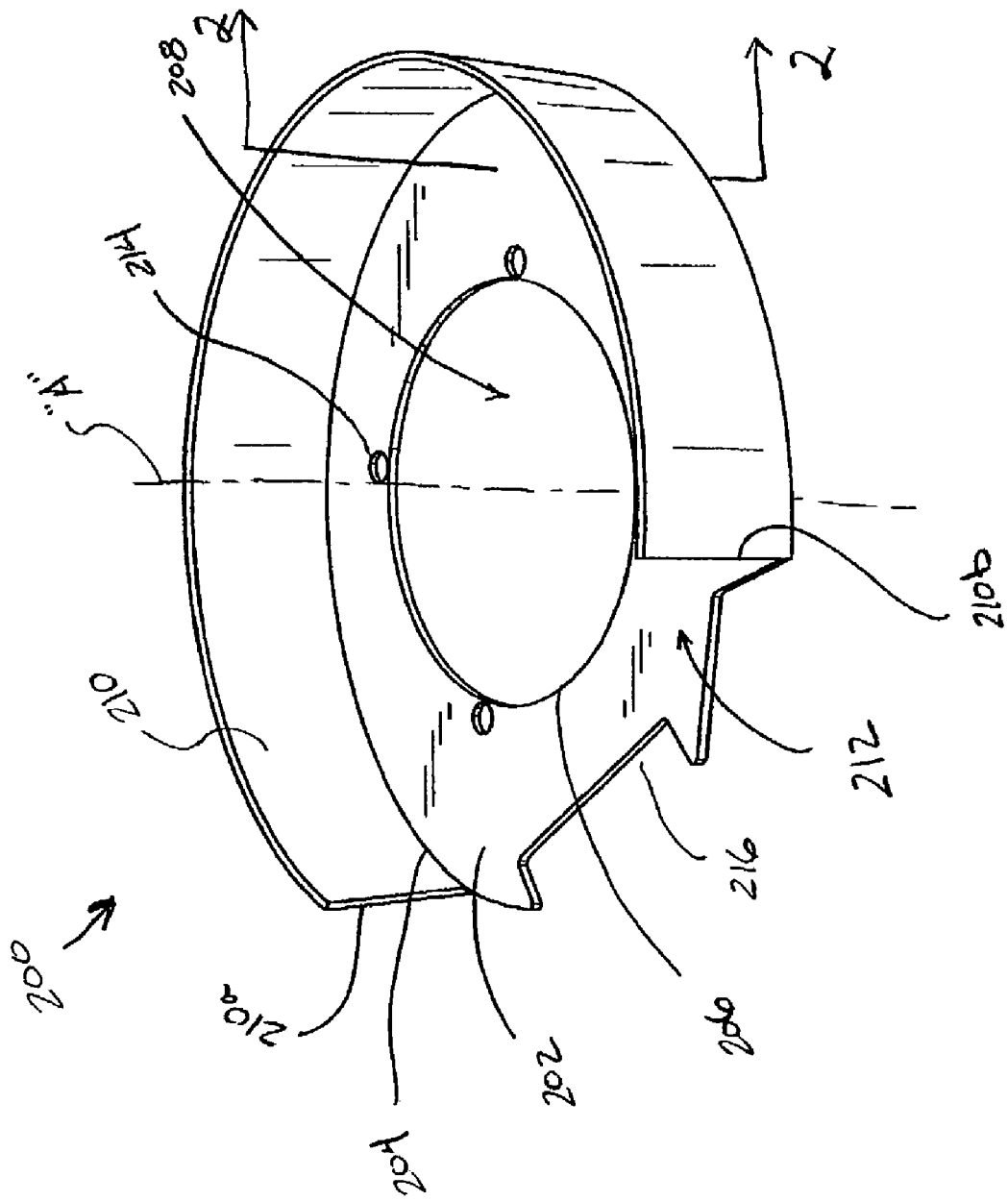
FIG. 2 is a perspective view a shroud in accordance with an embodiment of the present disclosure.
Figure 4:
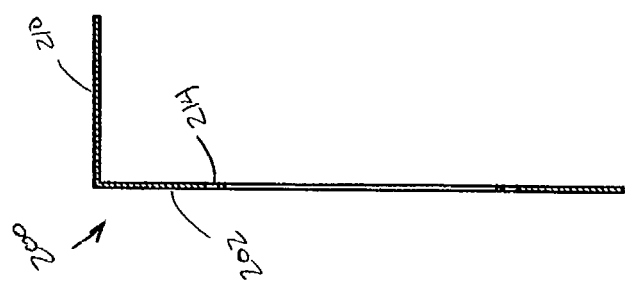
FIG. 4 is a cross-sectional side elevational view of the shroud of FIG. 2 as taken through line 4-4 of FIG. 3.
Figure 3:
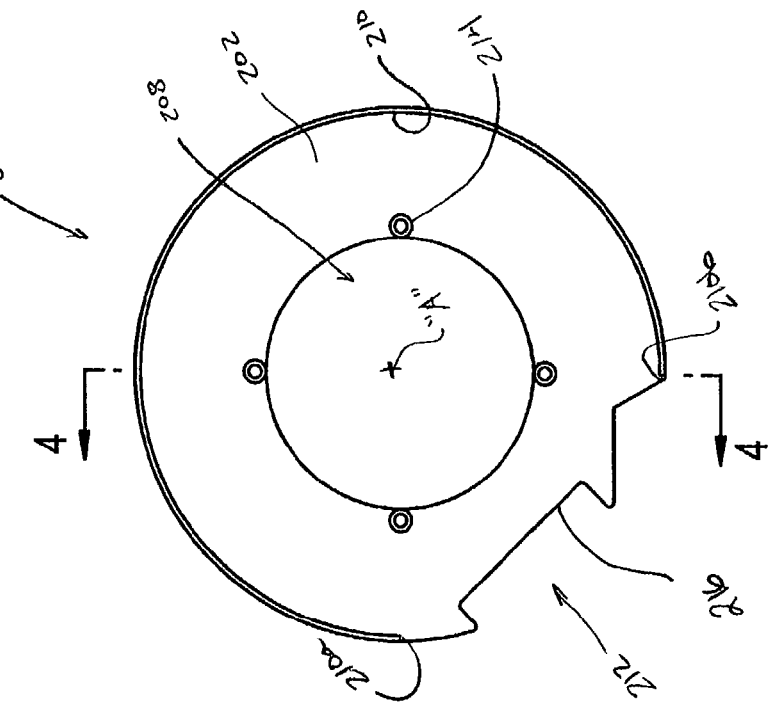
FIG. 3 is a plan view of the shroud of FIG. 2.

Turning now to FIGS. 2-4, a shroud for use with any of the prior art optical system embodiments shown in FIGS. 1A-1C, is shown generally as 200. Shroud 200 includes a ring-like planar base wall 202 and an annular side wall 210 extending therefrom. Base wall 202 includes an outer terminal edge 204 and an inner terminal edge 206 defining an aperture 208 formed in base wall 202. Preferably, base wall 202 and aperture 208 are co-axial defining a central axis "A". Aperture 208 is configured and dimensioned to permit the emitted light reflected from spinning mirror 126, as will be described in greater detail below, to pass therethrough and onto a photomultiplier tube (PMT) or detector 120.

Annular wall 210 preferably extends from outer terminal edge 204 of base wall 202 and is substantially orthogonally oriented with respect to base wall 202. However, as seen in FIG. 2B, it is contemplated that annular wall 210 can be oriented at an angle greater or less than 90° with respect to base wall 202. Annular wall 210 extends substantially around an entire length of outer terminal edge 204. Preferably, annular wall 210 extends approximately 270° about outer terminal edge 204, terminating in terminal end walls 210a, 210b defining an opening 212. Opening 212 is configured and dimensioned to receive an arm (not shown) of transport 138 (see FIG. 9).

In designing shroud 200 it is preferable that shroud 200 is configured and dimensioned to block a maximum amount of air and/or light possible while simultaneously not interfering with the transmission of the beam of light directed toward phosphor plate 14 or the stimulated light emanating from phosphor plate 14 and directed toward spinning mirror 26 and onto photomultiplier tube 20. Preferably, shroud 200 should be configured and dimensioned to extend radially outward a distance such that an outer terminal edge of shroud 200 is spaced a distance from the inner surface of cylinder portion 112 which is sufficient to permit phosphor plate 114 to pass between the outer terminal edge of shroud 200 and the inner surface of cylinder portion 112.

Figure 2A:
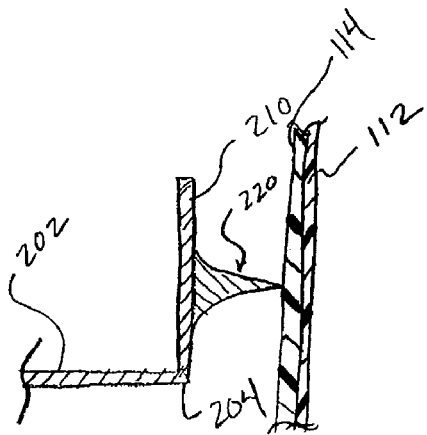
FIG. 2A is a cross-sectional side elevational view of a shroud in accordance with an alternative embodiment of the present disclosure as taken through line 2-2 of FIG. 2.
Figure 2B:
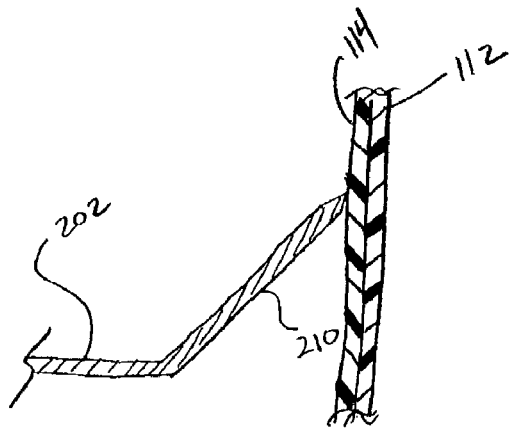
FIG. 2B is a cross-sectional side elevational view of a shroud in accordance with yet another embodiment of the present disclosure as taken through line 2-2 of FIG. 2.

As seen in FIG. 2A, base wall 202 can be configured and dimensioned to extend radially outward a relatively greater distance such that outer terminal edge 204 is proximate the inner surface of cylinder portion 112 and wherein a wiper 220 is provided on the outer surface of annular wall 210 which wiper 220 is configured and dimensioned to substantially fill the gap between annular wall 210 and the inner surface of cylinder portion 112. Alternatively, it is envisioned that base wall 202 extends radially outward a relatively smaller distance and wherein wiper 220 is configured and dimensioned to fill the relatively larger gap between annular wall 210 and the inner surface of cylinder portion 112. Preferably, wiper 220 is constructed from a resilient polymeric material and/or a brush-like material. In this manner, wiper 220 can contact phosphor plate 114 and simple lightly graze over the surface thereof without damaging or otherwise interfering with the surface of phosphor plate 114. Preferably, annular wall 210 extends proximally a distance sufficient to block as much errant light as possible without interfering with the transmission of the beam of the stimulated light released from phosphor plate 114. In this manner, shroud 200 is effective in blocking substantially all of the light from traveling distally through cylinder portion 112 and/or from prematurely striking photomultiplier tube 120.

Figure 2C:
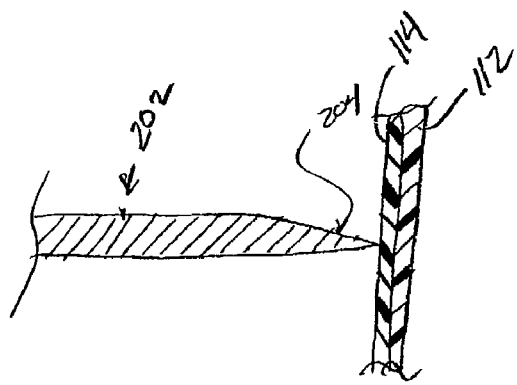
FIG. 2C is a cross-sectional side elevational view of a shroud in accordance with still another embodiment of the present disclosure as taken through line 2-2 of FIG. 2.
Figure 2D:
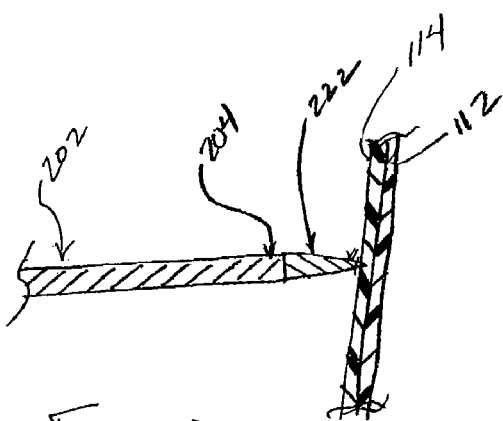
FIG. 2D is a cross-sectional side elevational view of a shroud in accordance with a further embodiment of the present disclosure as taken through line 2-2 of FIG. 2.

Turning now to FIGS. 2C and 2D, annular wall 210 is removed and base wall 202 is configured and dimensioned to extend radially outward such that terminal edge 204 is in close proximity with the inner surface of cylinder portion 112. In FIG. 2C, base wall 202 is constructed from a polymeric material wherein base wall 202 is substantially rigid near the inner terminal edge (not shown) and becomes increasingly pliable and/or flexible in the radially outward direction. In this manner, outer terminal edge 204 will not damage phosphor plate 114 as it passes thereover. Alternatively, as seen in FIG. 2D, base wall 202 is constructed from a rigid material and a wiper 222 is affixed to outer terminal edge 204. Preferably, wiper 222 is constructed from a resilient polymeric material and/or a brush-like material. In either embodiment, base wall 202 is effective in blocking substantially all of the air and/or light from traveling distally through cylinder portion 112.

As seen in FIG. 2B and as previously described, annular wall 210 is oriented at an angle greater than 90° with respect to base wall 202. Preferably, angled annular wall 210 extends radially from terminal edge 204 of base wall 202 a distance such that the terminal edge of angled annular wall 210 grazes over phosphor plate 114. It is contemplated that angled annular wall 210 can be integrally formed with base wall 202 or can be fixedly secured to base wall 202. Preferably, angled annular wall 210 is constructed from a resilient polymeric material and/or a brush-like material in order to keep from damaging the surface of phosphor plate 114 and angled annular wall 210 slides thereover.

Preferably, shroud 200 may be constructed from any suitable material for blocking errant light in a CR application environment. In an exemplary embodiment, shroud 200 is constructed from a rigid durable material, such as, for example, aluminum and the like. In a particular example, shroud 200 is constructed from 3003-H14 Aluminum having a thickness of about 0.050. Additionally, it is envisioned that shroud 200 is finished to be "hard anodized", preferably colored black. Other coatings that minimize reflectance may also be used, such as dark surface finishes.

It is envisioned that base wall 202 of shroud 200 includes a plurality of radially oriented, preferably, evenly spaced, mounting holes 214 formed therein. Mounting holes 214 permit attachment of shroud 200 to transport 138 (see FIG. 9). As seen in FIG. 3, base wall 202 of shroud 200 includes a series of cut-outs 216 formed between terminal end walls 210a, 210b of annular side wall 210. Cut-outs 216 are configured and dimensioned to permit proper mounting of shroud 200 to transport 138.

Figure 5:
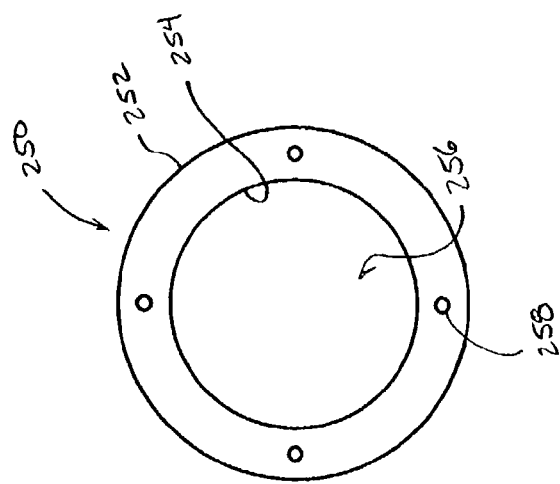
FIG. 5 is a plan view of a spacer in accordance with an embodiment of the present disclosure.

As seen in FIG. 5, a spacer is generally shown as 250. Spacer 250 is ring-like, having an outer terminal edge 252 and an inner terminal edge 254 defining an aperture 256. Preferably, outer terminal edge 252 of spacer 250 has a diameter which is greater than the diameter of inner terminal edge 254. Spacer 250 includes a plurality of mounting holes 258 formed therein. Preferably, mounting holes 258 of spacer 250 radially and axially align with mounting holes 214 of shroud 200.

Spacer 250 is typically used when shroud 200 is being mounted to an optical system 100 where aperture 208 is larger than necessary for mounting of shroud 200 to photomultiplier tube 120. Accordingly, spacer 250 is operatively coupled to shroud 200 such that a center of spacer 250 is axially aligned with axis "A" and thereby reduces the size of aperture 208 of shroud 200 to the size of aperture 256 of spacer 250.

Turning now to FIGS. 6-9, operation of optical systems 100, in cooperation with shroud 200, is shown. As seen in FIGS. 6-9, shroud 200 is mounted to photomultiplier tube 120 in a manner such that axis "A" is aligned with an axis of rotation 116 of a shaft 128 supporting a spinning mirror surface 126 and such that annular wall 210 extends in the direction of spinning mirror 126. Preferably, base wall 202 of shroud 200 is placed between a distal surface of photomultiplier tube 120 and filter 124. In this manner annular wall 210 extends distally over filter 124. Preferably, annular wall 210 extends an amount which is sufficient to extend past a distal surface of filter 124.

With shroud 200 in position, operation of optical apparatus 100 involves the presentation of an X-ray exposed phosphor plate or film 114 to the interior of a fixed portion of a hollow cylinder 112 to which phosphor plate 114 is pressed firmly in order for phosphor plate 114 to conform to the circular configuration of the cylindrical portion. Spinning mirror 126 is then mounted in optical system 100 such that a surface of spinning mirror 126 is angled at 45° with respect to its axis of rotation 116.

The scanning operation then involves the activation of a light source 118, such as, for example, a 635 nm laser, thus creating a beam "X" which is co-linear with central axis 16 in order for beam "X" to be bent 90° by spinning mirror 126 and in order to form a rotating spot on phosphor plate 114 that follows a path of a portion of a circle.

Figure 6:
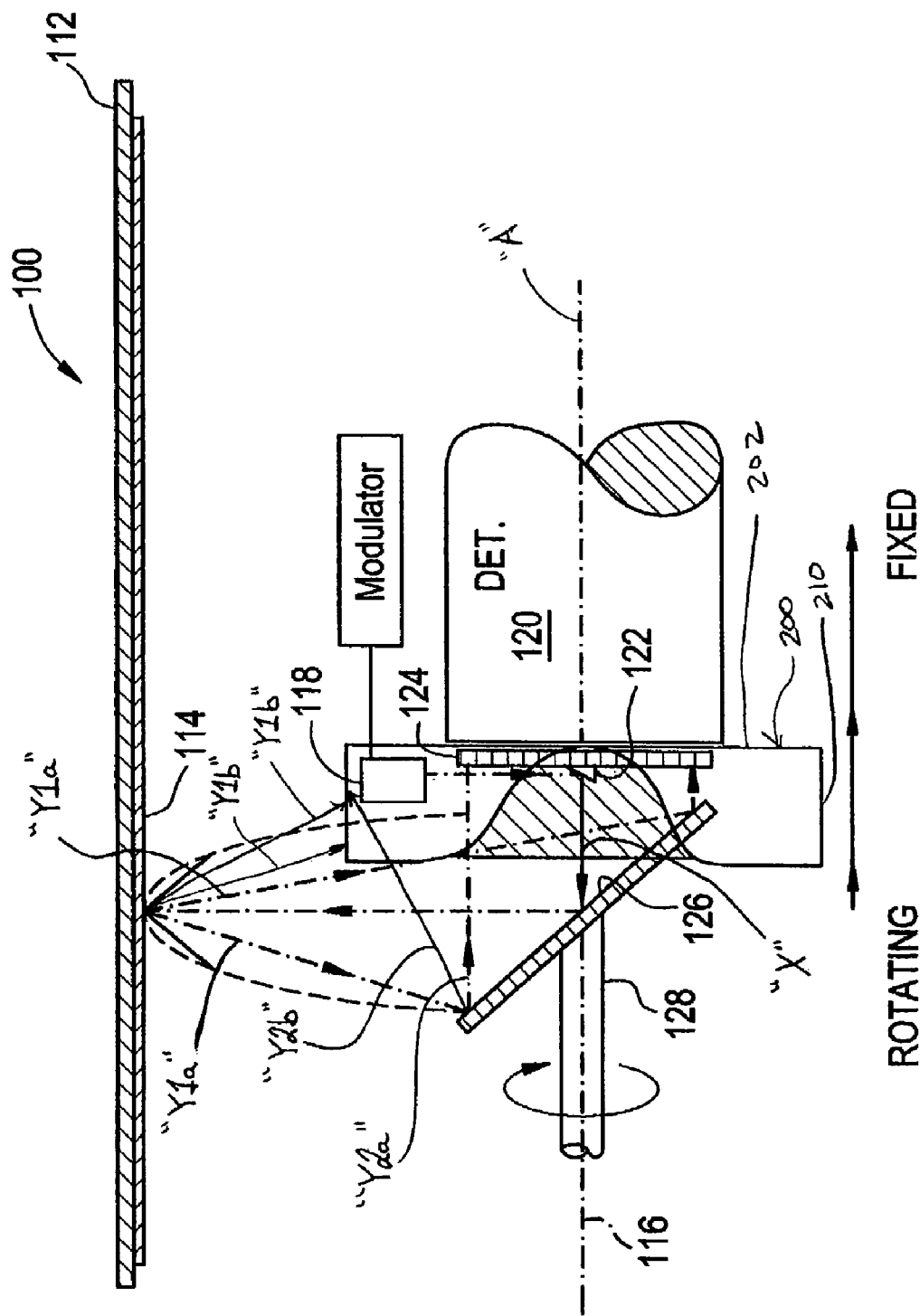
FIG. 6 is a schematic representation of one embodiment of an optical system in accordance with the present disclosure, incorporating the shroud of FIG. 2 therein.

As seen in FIG. 6, when beam "X" emanates from between rotating mirror 126 and filter 124, no hole in rotating mirror 126 is required. Preferably, light source 118 is positioned such that beam "X" is transmitted toward central axis 16 in a plane parallel to the surface of filter 124. A small mirror 122 is positioned on the surface of filter 124, along central axis 116, for redirecting beam "X" toward spinning mirror 126, preferably, along central axis 116, which beam "X" is then redirected by spinning mirror 126 in a perpendicular direction onto phosphor plate 114.

Figure 7:
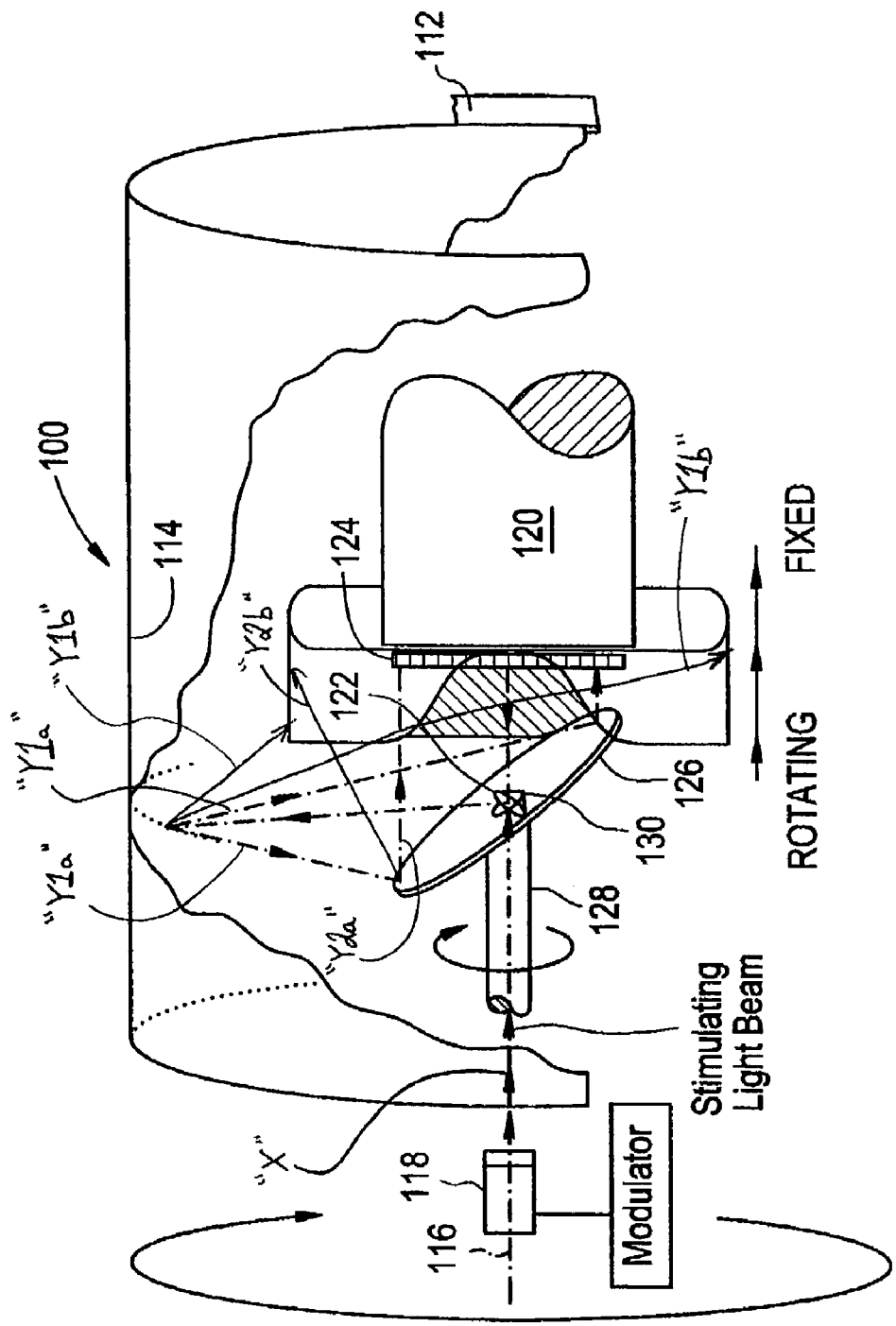
FIG. 7 is a schematic representation of an alternative embodiment of an optical system in accordance with the present disclosure, incorporating the shrouds of FIG. 2 therein.
Figure 8:
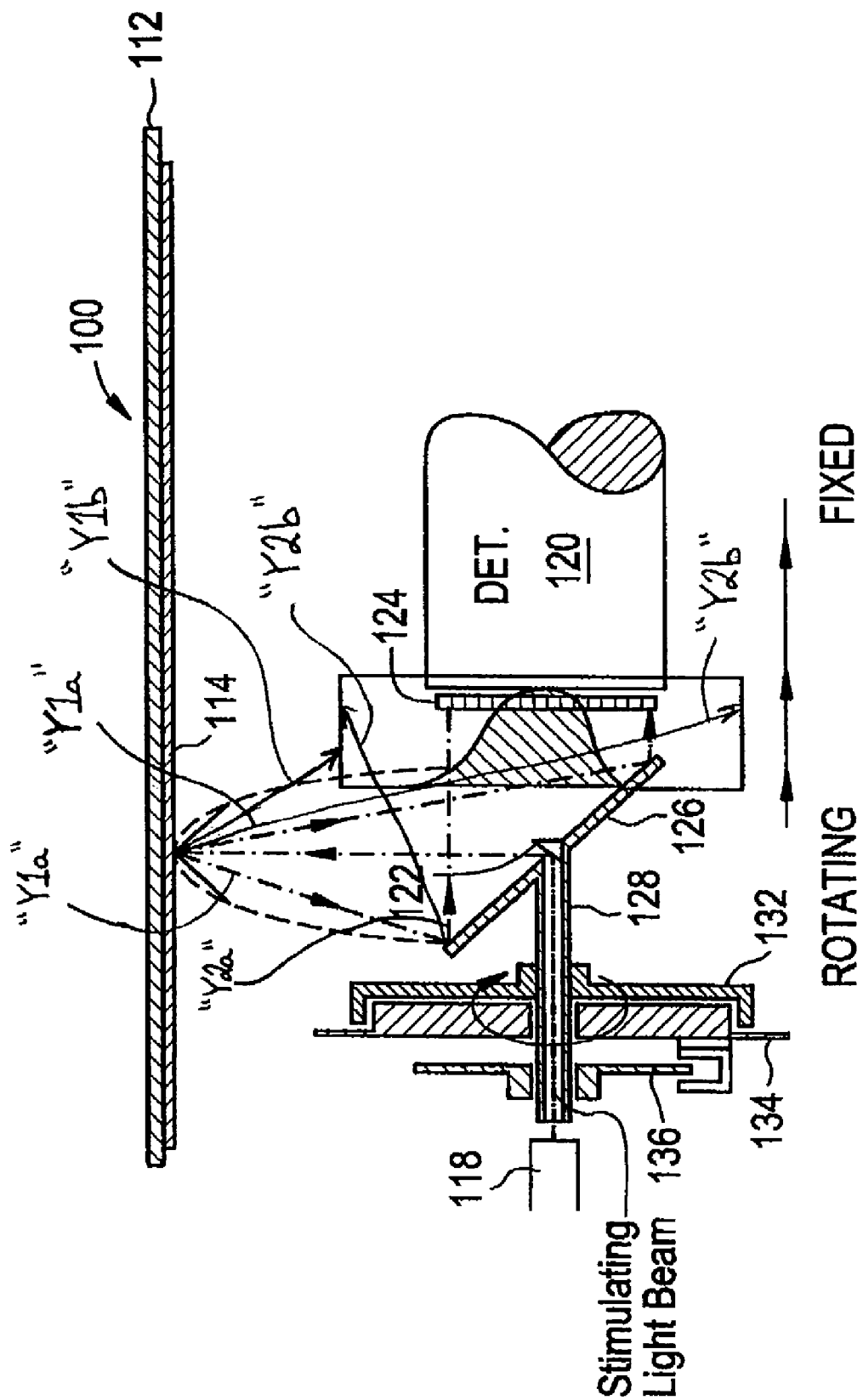
FIG. 8 is a schematic view of the embodiment of FIG. 6 with a rotative drive and encoding system that is applicable to each of the embodiment shown herein.

As seen in FIGS. 7 and 8, when beam "X" emanates from behind rotating mirror 126, along central axis 116, a hole 130 is required at the center of rotating mirror 126 and a small mirror 122 positioned within the hole and oriented in such a manner so as to redirect beam "X" in a perpendicular direction toward phosphor plate 114.

Returning to FIGS. 1A-1C, during a readout of a previously X-ray exposed phosphor plate 14, light source 18 transmits beam "X" onto phosphor plate 14 thereby stimulating a crystal layer of phosphor plate 14 causing it to radiate a light "Y" at 390 nm as beam "X" makes its scan across phosphor plate 14. Radiant light "Y" is dispersed in all directions and can be generalized as being divided into at least two components, a first radiant component "Y1a" which is directed toward spinning mirror 26 and a second radiant component "Y1b" which is not directed toward spinning mirror 26. In operation, second radiant component "Y1b" of light "Y1" directed away from spinning mirror 26 (e.g., longitudinally proximally down tube 12 and/or radially around tube 12) strikes a region of phosphor plate 14 which has not yet been stimulated. Second radiant component "Y1b" can in turn prematurely stimulate the crystal layer of phosphor plate 14 causing it to release light prior to stimulation by beam "X". As such, when beam "X" does stimulate the region of phosphor plate 14 which has been prematurely stimulated by second radiant component "Y1b", less light is radiated from the crystal layer as compared to if the crystal layer had not been previously excited. In addition, second radiant component "Y1b" can strike filter 24 at an angle as compared to directly off of spinning mirror 26, thereby causing errant image information to reach detector 20.

Meanwhile, first radiant component "Y1a" of light "Y1" strikes the surface of spinning mirror 26 resulting in first radiant component "Y1a" being reflected in all directions and can be generalized as being divided into at least two components, a first reflected component "Y2a" which is directed toward filter 24 and a second reflected component "Y2b" which is not directed toward filter 24 (e.g., longitudinally proximally down tube 12 and/or radially around tube 12). First reflected component "Y2a" travels toward filter 24, passes through filter 24 and strikes photomultiplier tube 20 which in turn converts first reflected component "Y2a" into an electrical signal that is amplified and gated to represent one pixel on the circular scan. However, second reflected component "Y2b" can in turn prematurely stimulate the crystal layer of phosphor plate 14 causing it to release light prior to stimulation by beam "X". As such, when beam "X" does stimulate the region of phosphor plate 14 which may have been prematurely stimulated by second reflected component "Y2b", less light is radiated from the crystal layer as compared to if the crystal layer had not been previously excited.

As seen in FIGS. 6-8, shroud 200 improves the CR image in at least one of two ways, namely, reducing the effects of second radiant light "Y1b" on phosphor plate 114 and/or reducing the effects of second reflected light "Y2b" on phosphor plate 114. In one aspect, annular wall 210 and back wall 202 of shroud 200 reduce, if not eliminate, the amount of second radiant light "Y1b" traveling past spinning mirror 126 and prematurely stimulating the crystal layer of phosphor plate 114 by blocking second radiant light "Y1b" from ever traveling proximally down tube 112. In addition, annular wall 210 and back wall 202 of shroud 200 reduce, if not eliminate, the amount of second reflected light "Y2b" traveling past filter 114 and prematurely stimulating the crystal layer of phosphor plate 114 by blocking second radiant light "Y2b" from ever traveling proximally down tube 112.

Preferably, shroud 200 is provided with a black finish, and more preferably, not polished. In this manner, shroud 200 more readily absorbs second radiant light "Y1b" and second reflected light "Y2b" thus reducing the possibility of second radiant light "Y1b" being reflected and second reflected light "Y2b" from being re-reflected against phosphor plate 114.

Figure 9:
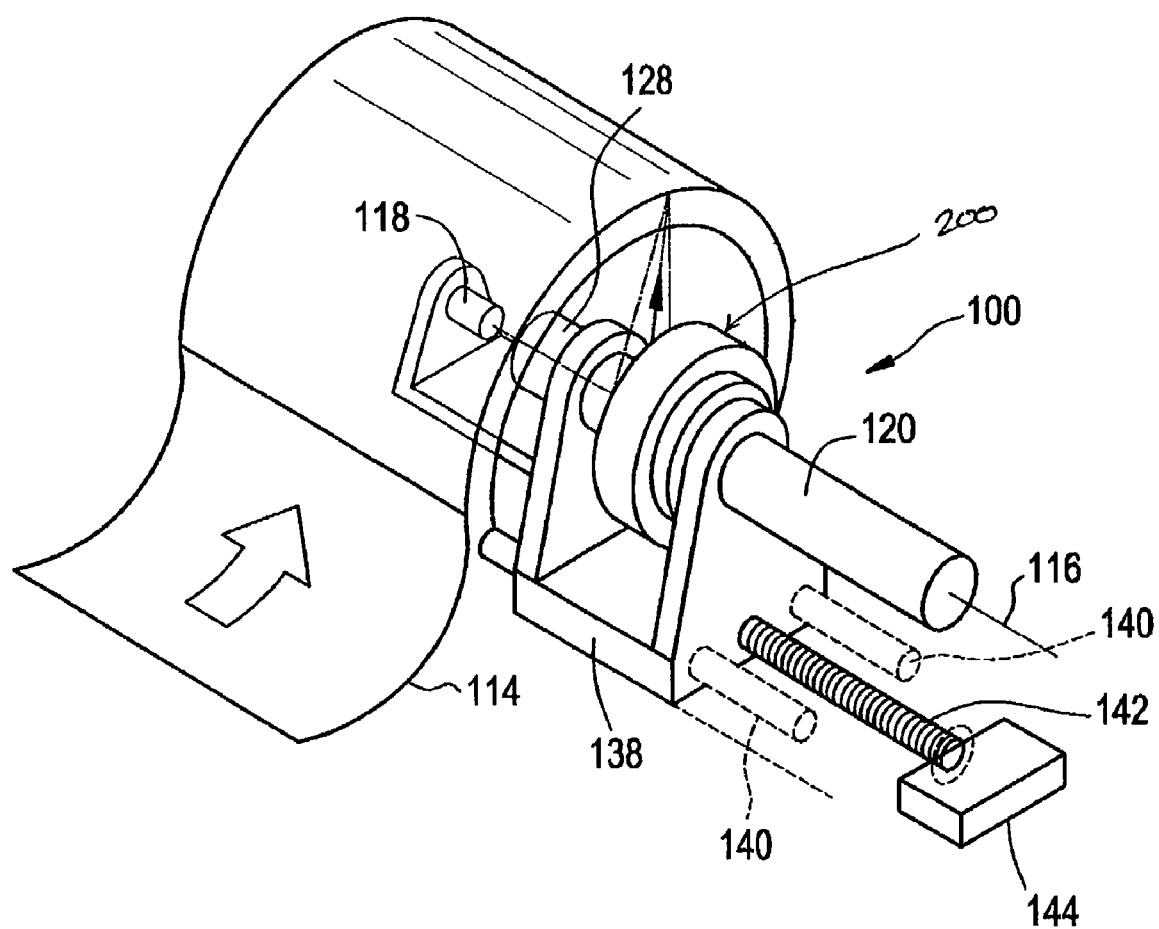
FIG. 9 is a perspective view of a representation of a system for axial movement of the optical system.

Schematically illustrated in FIG. 9 is a means for effecting the axial path spacing of optical system 100 having shroud 200 mounted thereto. While the means for movement of optical system 100 along axis 116 can be accomplished in a variety of ways, only one method is illustrated and will be described. As shown in FIG. 9, a support structure 138 is provided having a pair of rods 140 for stabilizing, guiding and maintaining the direction of support structure 138 in a straight line. A threaded member 142, fixed with respect to any axial movement, is engaged with mating threads in support structure 138 for its axial movement in order to obtain the traversing for scanning of the focused spot with respect to phosphor plate 114. A linear stepping motor 144 (schematically shown) provides the rotation of threaded member 142 to accurately space the separate scans across phosphor plate 114.

Turning now to FIG. 10, a block diagram illustrating the control of optical system 100, having shroud 200 mounted thereto, is shown. As seen in FIG. 10, a DC motor 132, 134, encoder 136 and spinning mirror 126 are connected for simultaneous rotary operation. Motor 132 has a rotation motor control 146, which in turn is connected for cooperation with encoder 136. A stepper motor 144 is provided having a linear stepper control 150, which is also connected with the output from encoder 136. The output from photomultiplier tube 120 and that of encoder 136 provide input to an analog processing unit 148, which provides its output to an analog to digital converter 152 for connection with a PC computer 154.

While shroud 200 has been described as blocking radiant light "Y1b" not directed toward spinning mirror 26 and second reflected component "Y2b" not directed toward filter 24, it is envisioned that shroud 200 is effective in blocking any errant light from entering photomultiplier tube 120 from any external and/or internal light source.

It will be understood that various modifications may be made to the embodiments disclosed herein. Therefore, the above description should not be construed as limiting, but merely as an exemplification of preferred embodiments. Those skilled in the art will envision other modifications within the scope and spirit of the claims appended hereto.

What is claimed is:

1. An optical system for an internal drum readout apparatus, comprising:
a hollow cylindrical segment defining a central axis, the cylindrical segment forming a support surface for a medium to be scanned while the medium conforms to an inner surface thereof;
a support structure configured and adapted to translate along the central axis;
a mirror mounted on the support structure for translational movement therewith and for rotational spinning around the central axis, the mirror angled with respect to the central axis;
a light source mounted to the support structure for providing a beam capable of being directed along the central axis which in turn is directed against the medium thereby producing a stimulated light;
a detector coaxially aligned with the central axis, the detector being configured and adapted to absorb stimulated light direct toward and reflected off of the angled mirror; and
a shroud mounted on the support structure for blocking stimulated light which is not directed toward the angled mirror, wherein the stimulated light which is not directed toward the angled mirror would otherwise degrade the medium prematurely, the shroud including:
a base wall defining a central aperture and a plurality of mounting holes located between said central aperture and an outer terminal edge of said base wall for mounting the shroud to the support structure, such that the mirror rotates relative to the shroud; and
a structure protruding from said base wall.

2. The optical system according to claim 1, wherein the shroud is configured and dimensioned to block stimulated light which is not directed toward the detector.

3. The optical system according to claim 1, wherein the shroud is configured and dimensioned to block errant light from entering the detector.

4. The optical system according to claim 1, wherein the structure protruding from the base wall is an annular wall integrally formed around the outer terminal edge of the base wall.

5. The optical system according to claim 4, wherein the annular wall of the shroud extends toward the angled mirror.

6. The optical system according to claim 5, wherein the annular wall is orthogonally oriented with respect to the base wall.

7. The optical system according to claim 6, wherein the annular wall extends toward the angled mirror a distance sufficient to block errant light while still permitting transmission of the beam and the stimulated light.

8. The optical system according to claim 7, further comprising a wiper extending along the outer surface of the annular wall, wherein the wiper reduces a gap between the outer surface of the annular wall and the inner surface of the hollow cylindrical segment.

9. The optical system according to claim 8, wherein the wiper is constructed from at least one of a resilient polymeric material and a brush-like material.

10. The optical system according to claim 6, wherein the mirror is angled at about 45° relative to the central axis.

11. The optical system according to claim 6, wherein the minor reflects the stimulated light toward the detector.

12. The optical system according to claim 11, wherein the minor reflects the beam toward the medium.

13. The optical system according to claim 12, wherein the light source is proximal of the angled mirror and wherein the detector includes a reflecting surface mounted thereto for directing the beam toward the angled mirror.

14. The optical system according to claim 11, wherein the light source is distal of the angled mirror and wherein the angled mirror includes a central opening through which the beam passes and a reflecting surface mounted to the angled minor for directing the beam toward the medium.

15. The optical system according to claim 6, wherein the light source is a laser.

16. The optical system according to claim 6, wherein the medium is a phosphor plate.

17. The optical system according to claim 16, wherein the phosphor plate emits a stimulated light when excited by the beam which stimulated light corresponds to data recorded thereon.

18. The optical system according to claim 6, wherein the detector includes a filter which permits light having a specific wavelength therethrough.

19. The optical system according to claim 1, wherein the shroud includes the base wall extending radially outward and having the outer terminal edge in close proximity with the inner surface of the hollow cylindrical segment.

20. The optical system according to claim 19, wherein the base wall is constructed from a polymeric material.

21. The optical system according to claim 19, further comprising a wiper extending radially outward from the outer terminal edge thereof, wherein the wiper is constructed from at least one of a resilient polymeric material and a brush-like material.

22. The optical system according to claim 1, wherein at least one of the plurality of mounting holes is located between the central aperture and the structure protruding from the base wall.

23. An improved scanning apparatus of the type having a fixed, hollow cylindrical segment having a central, longitudinal axis, the interior of which forms a concave surface for intimate contact with a medium for recording and/or readout; a support structure forming a transport for translational movement along said axis; a light source mounted on said transport for movement therewith and for providing a beam capable of being directed along said axis; a slanted mirror, angled 45 degrees with respect to said axis and mounted on said transport for translational movement therewith and for rotational spinning around said axis, said mirror configured to reflect back the stimulated light into said hollow cylindrical segment and to reflect the stimulating light, wherein the improvement comprises:
   a shroud mounted on the support structure, such that the mirror rotates relative to the shroud, for blocking the stimulated light which is not directed toward the angled mirror, wherein the stimulated light which is not directed toward the angled mirror degrades the medium prematurely.

24. The apparatus according to claim 23, wherein the shroud is configured and adapted to block stimulated light which is not directed toward the detector and to block errant light from entering the detector.

25. The apparatus according to claim 23, wherein the shroud includes:
   a base wall defining a central aperture and a plurality of mounting holes located between said central aperture and an outer edge of said base wall for mounting the shroud to the support structure; and
   a structure protruding from said base wall.

26. The apparatus according to claim 25, wherein at least one of the plurality of mounting holes is located between the central aperture and the structure protruding from the base wall.

27. A method of improving a computer radiography image in a scanning apparatus having a fixed hollow cylindrical segment including a central, longitudinal axis, the interior of which forms a concave surface for intimate contact with a medium for recording and/or readout; a support structure forming a transport for translational movement along the axis; a light source mounted on the transport for movement therewith and for providing a beam capable of being directed along the axis; a slanted mirror, angled 45 degrees with respect to the axis and mounted on the transport for translational movement therewith and for rotational spinning around the axis, the mirror configured to reflect the stimulated light onto a collector tube, the method comprising the steps of:
   providing a shroud device for reducing the collection of stimulated light and errant light which is not directed toward the angled minor and which would otherwise prematurely degrade the medium, the shroud device including:
      a base wall defining a central aperture and a plurality of mounting holes located between said central aperture and an outer edge of said base wall for mounting the shroud to the support structure, such that the mirror rotates relative to the shroud; and
      a structure protruding from the base wall; and
   mounting the shroud device to the collector tube such that the annular wall extends towards the angled mirror.

28. The method according to claim 27, further comprising the step of:
   providing a wiper on the outer surface of the structure protruding from the base wall to reduce a gap between the outer surface of the structure protruding from the base wall and an inner surface of the cylindrical segment.

29. The method according to claim 27, wherein at least one of the plurality of mounting holes is located between the central aperture and the structure protruding from the base wall.

30. An optical system for an internal drum readout apparatus, comprising:
   a hollow cylindrical segment defining a central axis, the cylindrical segment forming a support surface for a medium to Lie scanned while the medium conforms to an inner surface thereof;
   a support structure configured and adapted to translate along the central axis;
   a mirror mounted on the support structure for translational movement therewith and for rotational spinning around the central axis, the mirror angled with respect to the central axis;
   a light source mounted to the support structure for providing a beam capable of being directed along the central axis which in turn is directed against the medium thereby producing a stimulated light;
   a detector coaxially aligned with the central axis, the detector being configured and adapted to absorb stimulated light direct toward and reflected off of the angled mirror; and
   a shroud mounted on the support structure for blocking stimulated light which is not directed toward the angled mirror, wherein the stimulated light which is not directed toward the angled mirror would otherwise degrade the medium prematurely, the shroud including:
      a base wall having a central aperture and a plurality of mounting holes located between said central aperture and an outer edge of said base wall for mounting the shroud to the support structure, such that the mirror rotates relative to the shroud; and
      a structure protruding from the base wall.

31. The optical system according to claim 30, wherein the structure protruding from the base wall extends at an outward angle relative to the base wall.

32. The optical system according to claim 30, wherein the structure protruding from the base wall extends at an angle of approximately 90° from the base wall.

33. The optical system according to claim 30, wherein at least one of the plurality of mounting holes is located between the central aperture and the structure protruding from the base wall.

34. An improved scanning apparatus of the type having a fixed, hollow cylindrical segment having a central, longitudinal axis, the interior of which forms a concave surface for intimate contact with a medium for recording and/or readout; a support structure forming a transport for translational movement along said axis; a light source mounted on said transport for movement therewith and for providing a beam capable of being directed along said axis; a slanted mirror, angled 45 degrees with respect to said axis and mounted on said transport for translational movement therewith and for rotational spinning around said axis, said mirror configured to reflect back the stimulated light into said hollow cylindrical segment and to reflect the stimulating light, wherein the improvement comprises:

a shroud mountable to the support structure, such that the mirror rotates relative to the shroud, for blocking the stimulated light not directed toward the angled mirror, wherein the stimulated light not directed toward the angled mirror degrades the medium prematurely, the shroud including:
  a base wall having an outer terminal edge and defining a central aperture, the base wall further defining a plurality of mounting holes located between said central aperture and the outer terminal edge; and
  a structure contiguous with and extending at an angle relative to the base wall.

35. The scanning apparatus according to claim 34, wherein the structure protruding from the base wall extends at an outward angle relative to the base wall.

36. The scanning apparatus according to claim 34, wherein the structure protruding from the base wall extends at an angle of approximately 90° from the base wall.

37. The scanning apparatus according to claim 34, wherein at least one of the plurality of mounting holes is located between the central aperture and the structure protruding from the base wall.

38. An optical system for an internal drum readout apparatus, comprising:
  a hollow cylindrical segment defining a central axis, the cylindrical segment forming a support surface for a medium to be scanned while the medium conforms to an inner surface thereof;
  a transport configured and adapted to translate along the central axis;
  a mirror mounted on the transport for translational movement therewith and for rotational spinning around the central axis, the mirror angled with respect to the central axis;
  a light source mounted to the transport for providing a beam capable of being directed along the central axis which in turn is directed against the medium thereby producing a stimulated light;
  a detector coaxially aligned with the central axis, the detector being configured and adapted to absorb stimulated light direct toward and reflected off of the angled mirror; and
  a shroud operatively mounted to the transport, such that the mirror rotates relative to the shroud, for blocking stimulated light which is not directed toward the angled mirror, wherein the stimulated light which is not directed toward the angled mirror would otherwise degrade the medium prematurely.

39. The optical system according to claim 38, wherein the shroud includes:
  a base wall having a central aperture and being configured and adapted for mounting to the transport; and
  a side wall contiguous with and extending from the base wall.

* * * * *